(12) United States Patent
Paspirgilis

(10) Patent No.: US 8,597,560 B2
(45) Date of Patent: Dec. 3, 2013

(54) METHOD FOR MANUFACTURING (PARTLY) RING-SHAPED COMPONENTS, WHICH COMPRISE FIBRE-REINFORCED PLASTIC, FROM FIBRE-COMPOSITE SEMIFINISHED PRODUCTS

(75) Inventor: Bernd Ewald Paspirgilis, Bredegatter (DE)

(73) Assignee: Airbus Operations GmbH, Hamburg (DE)

( * ) Notice: Subject to any disclaimer, the term of this patent is extended or adjusted under 35 U.S.C. 154(b) by 211 days.

(21) Appl. No.: 12/812,335

(22) PCT Filed: Jan. 12, 2009

(86) PCT No.: PCT/EP2009/000121
§ 371 (c)(1),
(2), (4) Date: Jul. 9, 2010

(87) PCT Pub. No.: WO2009/087115
PCT Pub. Date: Jul. 16, 2009

(65) Prior Publication Data
US 2010/0295212 A1    Nov. 25, 2010

Related U.S. Application Data

(60) Provisional application No. 61/020,415, filed on Jan. 11, 2008.

(30) Foreign Application Priority Data

Jan. 11, 2008  (DE) .......................... 10 2008 003974

(51) Int. Cl.
*B29C 45/14* (2006.01)
(52) U.S. Cl.
USPC ........................................ 264/277

(58) Field of Classification Search
USPC ......................................... 264/277
See application file for complete search history.

(56) References Cited

U.S. PATENT DOCUMENTS

| 3,645,829 A | 2/1972 | Palfreyman |
| 4,362,685 A | 12/1982 | Simioni |

(Continued)

FOREIGN PATENT DOCUMENTS

| CN | 1775513 A | 5/2006 |
| DE | 1886051 U | 1/1964 |

(Continued)

OTHER PUBLICATIONS

International Search Report for corresponding PCT application PCT/EP2009/000121, dated May 12, 2009.

(Continued)

*Primary Examiner* — Larry Thrower
(74) *Attorney, Agent, or Firm* — Ingrassia Fisher & Lorenz P.C.

(57) ABSTRACT

A method for manufacturing (partly) ring-shaped components, which include fiber-reinforced plastic, from fiber-composite semifinished products, involving the steps of: positioning a multitude of ring-shaped or partly ring-shaped mold pieces on a rotatable drum in such a manner that they include a reel-shaped mold with a ring-shaped channel for receiving the semifinished product, applying the semifinished product in the channel of the ring-shaped mold, rotating the drum in such a manner that as a result of the centrifugal forces the matrix material is pressed towards the outside and air contained in the channel moves inwards, and curing the semifinished product with the application of temperature to form a plastic ring, removing the plastic ring from the ring-shaped mold.

13 Claims, 6 Drawing Sheets

(56) References Cited

U.S. PATENT DOCUMENTS

| | | |
|---|---|---|
| 4,479,769 A | 10/1984 | Simioni |
| 5,393,215 A | 2/1995 | Donovan, Sr. |
| 5,906,836 A | 5/1999 | Panaroni et al. |
| 6,890,470 B2 | 5/2005 | Staub |
| 2003/0173019 A1 | 9/2003 | Eberth |
| 2003/0178738 A1 | 9/2003 | Staub |

FOREIGN PATENT DOCUMENTS

| | | |
|---|---|---|
| DE | 2318353 A | 10/1974 |
| DE | 2919498 A1 | 1/1980 |
| DE | 3935133 C2 | 5/1991 |
| DE | 19906618 A1 | 8/2000 |
| EP | 1342556 A1 | 9/2003 |
| JP | 48022190 B | 7/1973 |
| JP | 06247770 A1 | 9/2006 |
| WO | 02058917 A2 | 8/2002 |

OTHER PUBLICATIONS

Daniel Gay, "Matérlux Composites" Hermes, Paris p. 42 (1997).
International Preliminary Report on Patentability and Written Opinion for corresponding PCT application PCT/EP2009/000121, dated May 12, 2009.
Chinese Office Action for corresponding Chinese Patent Application No. 200980102134.1, dated Oct. 10, 2012.

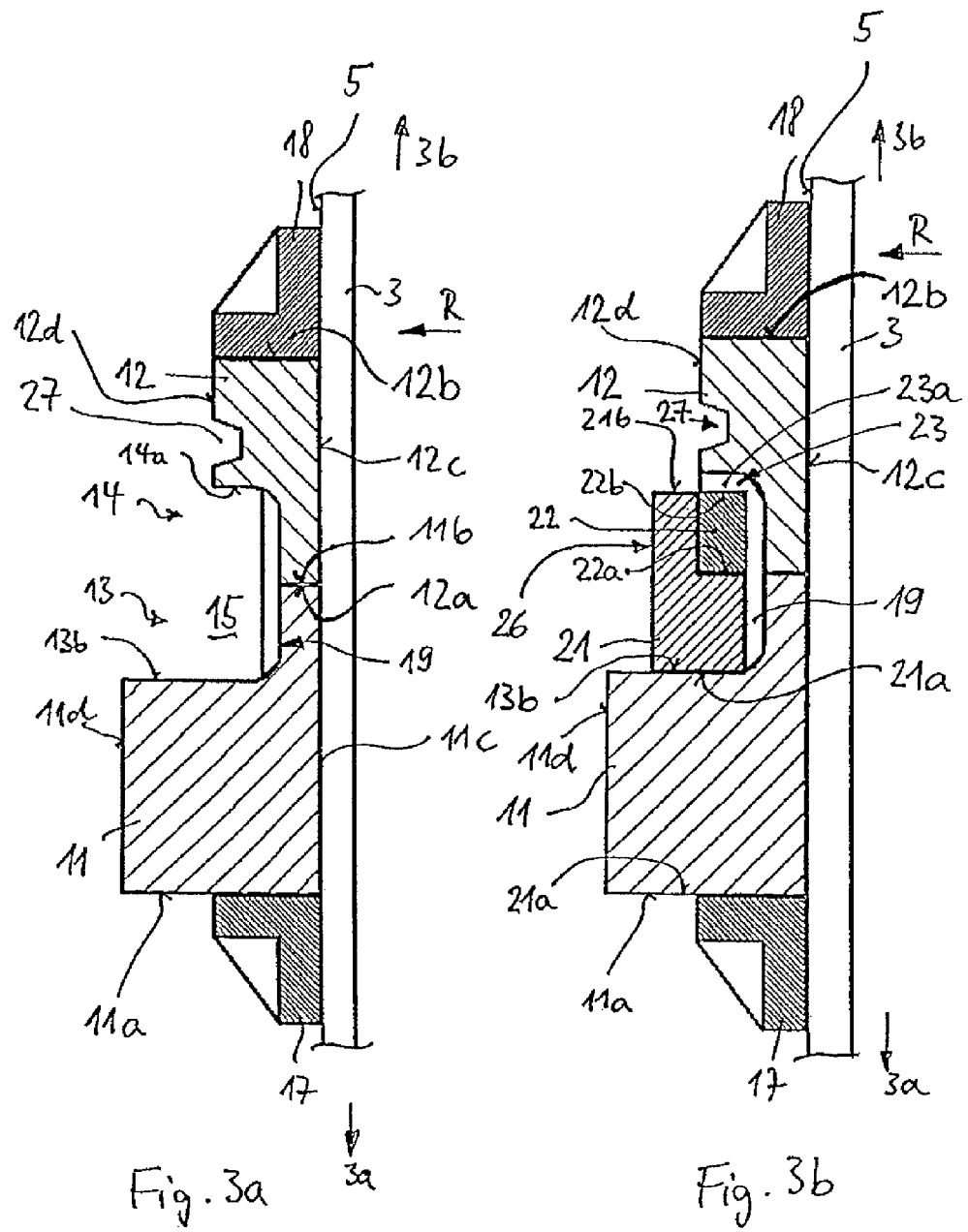

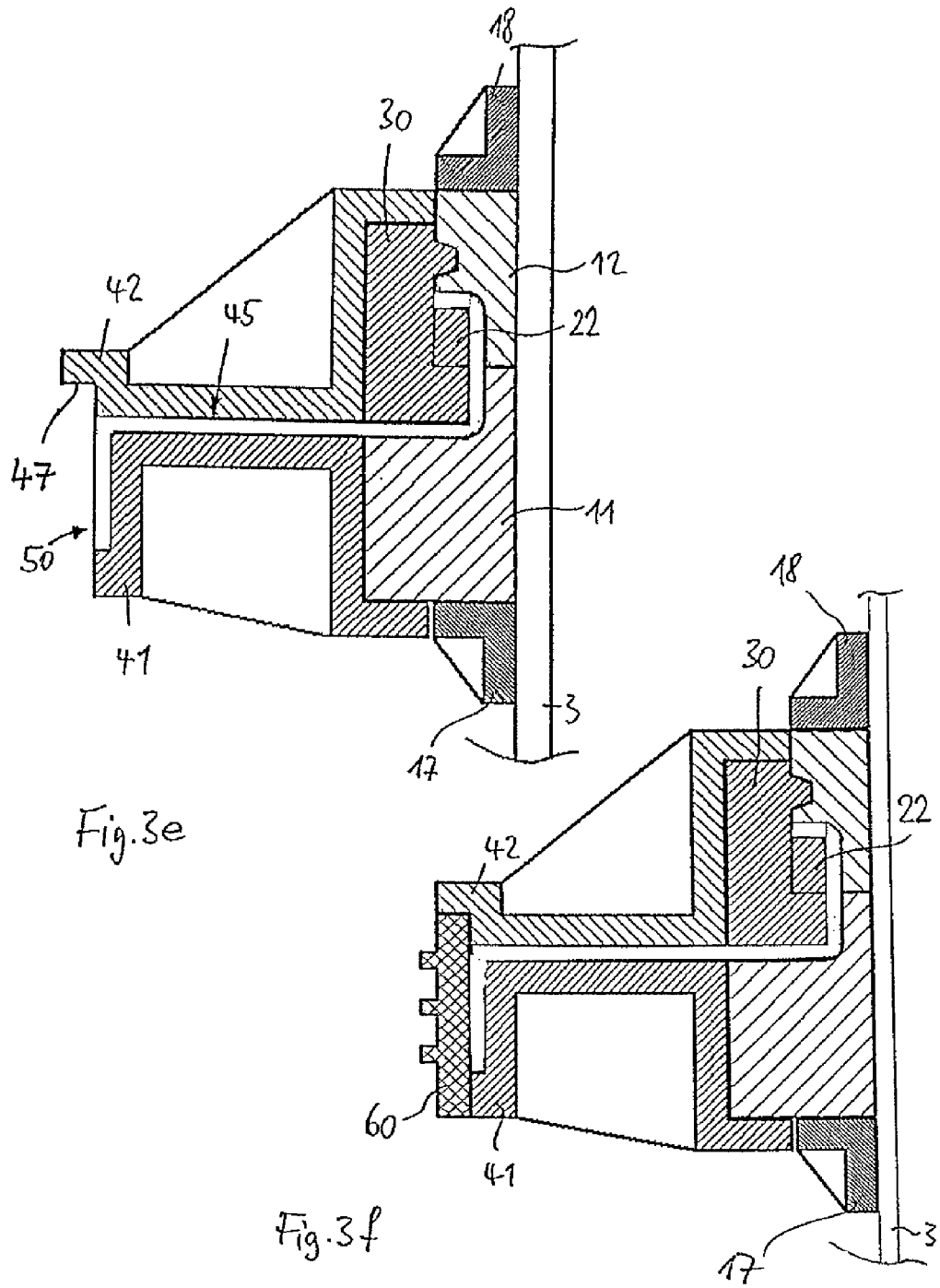

METHOD FOR MANUFACTURING (PARTLY) RING-SHAPED COMPONENTS, WHICH COMPRISE FIBRE-REINFORCED PLASTIC, FROM FIBRE-COMPOSITE SEMIFINISHED PRODUCTS

CROSS REFERENCE TO RELATED APPLICATIONS

This application claims priority to PCT Application No. PCT/EP2009/000121, filed Jan. 12, 2009; which claims priority to German Patent Application No. DE 10 2008 003 974.8, filed Jan. 11, 2008, and claims the benefit to U.S. Provisional Patent Application No. 61/020,415, filed Jan. 11, 2008, the entire disclosures of which applications are hereby incorporated by reference.

BACKGROUND

The invention relates to a method for manufacturing ring-shaped or partly ring-shaped components, which comprise fibre-reinforced plastic, from fibre-composite semifinished products.

In DE 199 06 618 A1 a method for manufacturing of products made of fibre reinforced materials using a winding method is described From JP 06247770 A1 (D1) a method for manufacturing a cylindrical component is known, in which method a CFRP composite material is arranged in a mould cavity of a centrifuge. In this process resin is placed into the cavity of the centrifuge by way of an aperture. Based on centrifugal force uniform impregnation of the composite material is achieved.

U.S. Pat. No. 5,393,215 B1 (D2) describes a method and a device for manufacturing a fibre composite component in which a composite material is placed in a mould cavity of a centrifuge. Subsequently the cavity is evacuated and is made to rotate so that resin from a container in the region of the centre of the centrifuge is displaced into the cavity.

DE 29 19 498 A1 discloses an apparatus for rotational moulding with a multitude of mould cavities that are connected, by way of channels, to a pouring duct that is arranged in the centre of the apparatus. As a result of centrifugal forces, the resin mixture from the pouring duct is pressed into the mould cavities. During the process of filling the cavities, the air contained in the mould is displaced in the direction of the axis of rotation and is released by way of a venting channel.

U.S. Pat. No. 5,906,836 B1 describes an apparatus for rotational moulding for manufacturing ring-shaped components from a PU material. A reinforcement wire can have been placed into the cavity.

Furthermore, from DE 39 35 133 C2 a winding method for manufacturing at least partly ring-shaped components is known, which method uses a reel comprising two mould pieces, which reel is rotatable on a longitudinal axis so that a unidirectional carbon fibre is wound onto the surface area. In this process the winding shape is controlled by way of the movement control system of a process management device, wherein in the region of lateral parts of the moulded articles a greater number of fibre layers are wound one on top of the other than is the case in the middle. The cavity of the reel is closed by means of covers and is filled with liquid plastic by means of a pouring aperture.

In WO 02/058917 A2 a centrifugal moulding method for manufacturing a product is described, wherein in this method raw material to be moulded is placed in a centrifuge. To ensure uniform thickness of the product, a compound is placed into the centrifuge, more precisely within a volume enclosed by the raw material. From this placed-in compound, during the moulding process during operation of the centrifuge additional force is exerted on the material to be moulded; in other words, pressure is exerted from the interior onto the material so that the material is made to contact the outer wall of the centrifuge.

In DE 2 138 353 A a method for impregnating semifinished products with matrix material is described, wherein the matrix material is centrifuged at very considerable kinetic energy, without the admixture of air, onto and into the semifinished product.

In DE 1 886 051 U a plate-mould centrifuge for manufacturing small components is described, which centrifuge comprises several plate moulds that are arranged one on top of the other that are together rotated on their shared centre axis and are supplied by way of a centrally arranged shared feed channel for matrix material.

SUMMARY OF THE INVENTION

It is the object of the invention to provide a method for manufacturing ring-shaped components, which comprise fibre-reinforced plastic, from fibre-composite semifinished products, by means of which method components with complex cross-sectional shapes can be manufactured.

This object is met by the characteristics of one or more embodiments disclosed and described herein. Further embodiments are also disclosed and described herein.

According to the invention a method is provided for manufacturing semifinished products or components, which are ring-shaped or partly ring-shaped and which comprise fibre-reinforced plastic, from fibre-composite semifinished products, with the method involving the steps of (a) positioning at least one ring-shaped or partly ring-shaped mould piece on a rotatable drum (3) such that they form a reel-shaped mould with a ring-shaped or partly ring-shaped channel section (19, 25, 33, 45, 50) that extends in radial direction and/or in longitudinal direction of the drum, (b) multilayer application of semifinished-product material in the channel section (19, 25, 33, 45, 50) of the reel-shaped mould, (c) at least one repetition of steps (a) and (b) with the addition of at least one ring-shaped or partly ring-shaped mould piece on the rotatable drum while forming a further channel section that continues on from the existing channel section, and placement of semifinished-product material in the channel section, wherein the created sequence of channel sections at least in part provides the mould for the component to be manufactured, (d) placing matrix material in the channel sections (19, 25, 33, 45, 50) with the insertion of semifinished-product material in individual channel sections or/and after forming at least one channel section, (e) after forming the channel sections (19, 25, 33, 45, 50) with semifinished-product material and matrix material contained therein, rotating the drum (3) in such a manner that as a result of the centrifugal forces the matrix material is pressed towards the outside and air contained in the channel is displaced radially inwards, (f) curing the matrix material contained in the channel (19, 25, 33, 45, 50) with the application of temperature to form a plastic ring, (g) after curing the ring-shaped semifinished product or component, separating the arrangement of mould pieces into sections, and removing the cured ring-shaped semifinished product or component.

According to the invention, thus step-by-step creation of the mould tool or of channel sections that join one another is provided, wherein in each case after completion of one of several channel sections in a dedicated process step the fibre semifinished product or semifinished-product material to be used for fibre composite components is inserted into the channel section created in each case.

According to the invention, prior to rotation of the drum, positioning of a multitude of ring-shaped or partly ring-shaped mould pieces and multilayer application of the semifinished product in the channel of the reel-shaped mould can take place several times in an alternating manner.

In the method according to the invention it can, in particular, be provided for two adjacent mould pieces to be designed in such a manner that they interact in a positive-locking manner so that the mould piece that is situated on the outside in radial direction of the drum is affixed in axial direction of the drum to the mould piece that is situated radially on the inside, and so that a sidewall, directed in the axial direction, of the mould piece that is situated on the outside forms a sidewall of a channel section.

It can be provided for two mould pieces to be placed on the respectively formed arrangement of mould pieces in such a manner that two opposing sidewalls of the mould pieces, which sidewalls extend along the radial direction of the drum, form a channel section so as to form a component web, which channel section follows on from a channel section that has already been formed by means of mould pieces, and that on corresponding receiving surfaces of the mould pieces a cover element that extends in circumferential direction is applied, which cover element closes off the formed channel section in radial direction towards the outside so that during rotation of the drum the end piece prevents the matrix material from moving out of the channel.

In this arrangement a surface of the cover element and the top of at least one of the mould pieces can form a channel section that extends in axial direction of the drum, which channel section follows on from a channel section that extends along the radial direction of the drum so as to form a component web, and that in order to form an axially extending flange, semifinished-product material is inserted and matrix material is introduced into the axially extending channel section.

Furthermore, according to the invention, in the formation of the reel-shaped mould with the ring-shaped channel comprising a multitude of ring-shaped or partly ring-shaped mould pieces at least one feed channel is formed for introducing matrix material into the channel. In this arrangement the feed channel can lead from the interior of the drum into the channel. As an alternative or in addition, a feed channel can be formed that leads from the channel to the external surroundings of the drum.

According to the method according to the invention, an end piece or a cover can be used that is arranged on the reel-shaped mould in such a manner that said end piece or cover radially closes the channel off on the outside so that during rotation of the drum the end piece prevents the matrix material from moving out of the channel.

According to the invention, after completion of the plastic ring, separation of said ring into sections, and removal of said ring can take place.

A resin or a metal melt can be used as a matrix material. Furthermore, a selection or a combination of rovings, fabrics, interlaid textile scrim, prepregs and/or yarns can be used as a semifinished product.

The mould pieces can comprise fibre-reinforced materials.

The arrangement of the mould pieces can be provided in such a manner that the channel of the reel-shaped mould is formed in such a manner that said channel forms the mould for a combination comprising at least one bead and at least one web for the component to be manufactured.

Positioning a multitude of ring-shaped or partly ring-shaped mould pieces on a rotatable drum can take place in such a manner that on the same drum in longitudinal direction of the drum side by side several components comprising fibre-composite semifinished products are manufactured and removed from the drum.

With the method according to the invention, in particular several cured semifinished products or components can be manufactured in a parallel process on the same drum, i.e. positioning of a multitude of ring-shaped or partly ring-shaped mould pieces on a rotatable drum can take place in such a manner that on the same drum mould pieces are positioned and that in longitudinal direction of the drum several formed semifinished products or components comprising fibre-composite semifinished products can be manufactured and removed from the drum.

According to the invention, thus the manufacture of a fibre-reinforced-plastic-containing ring-shaped or partly ring-shaped semifinished product or component from fibre-composite semifinished products is provided. The method according to the invention provides for a channel, by means of mould pieces, to be constructed step-by-step from channel sections in such a manner that said channel sections gradually form a mould of the component to be manufactured. Step-by-step the channel is formed from sections, wherein step-by-step, after manufacturing a channel section, in each case semifinished-product material for manufacturing a fibre composite component is inserted into said channel section. This means that the semifinished-product material can be inserted into the channel with the fibre orientation necessary for the manufacture of a fibre composite component. In this arrangement it is possible, for example, to insert fibre material into a channel section by means of a winding method. This is, in particular, possible if the respectively formed channel section is formed in such a manner that it extends in a rotation-symmetrical manner on the drum axis and is open radially towards the outside, thus providing access for the insertion of fibres or fibre strands or dry or impregnated semifinished products comprising fibres. According to the invention, furthermore, after formation of a channel section matrix material is introduced into the same, or after formation of several channel sections, the matrix material is introduced into the channel sections. The placement of semifinished products takes place, in particular, with a predetermined fibre orientation that is to correspond to the fibre orientation in the semifinished product or component to be manufactured, so that the manufacture of a complex predetermined mould, e.g. comprising radially extending webs and flanges that axially adjoin the aforesaid, is technically possible by means of a rotational method.

BRIEF DESCRIPTION OF THE DRAWINGS

Below, exemplary embodiments of the invention are described with reference to the enclosed figures which show the following:

FIG. 3a illustrates a support region of the rotatable drum with two ring-shaped mould pieces arranged on said drum, which mould pieces are laterally supported by fixing-angle rings, as well as with an application of a semifinished product to form an inner flange for the frame element to be manufactured, FIG. 3b illustrates a support region of the rotatable drum, on which support region, starting from the state shown in FIG. 3a, two further ring-shaped mould pieces have been placed to additionally form an inner bead of the frame element to be manufactured, FIG. 3e illustrates a support region of the rotatable drum, onto which support region, starting from the state shown in FIG. 3d with the already placed ring-shaped mould pieces, in addition an outer flange of the frame element to be manufactured has been wound, FIG. 3f illustrates a support region of the rotatable drum, on which support region, starting from the state shown in FIG. 3e, a ring-cover element to terminate the placed group of mould pieces has been placed.

DETAILED DESCRIPTION OF THE INVENTION

Figure 1:
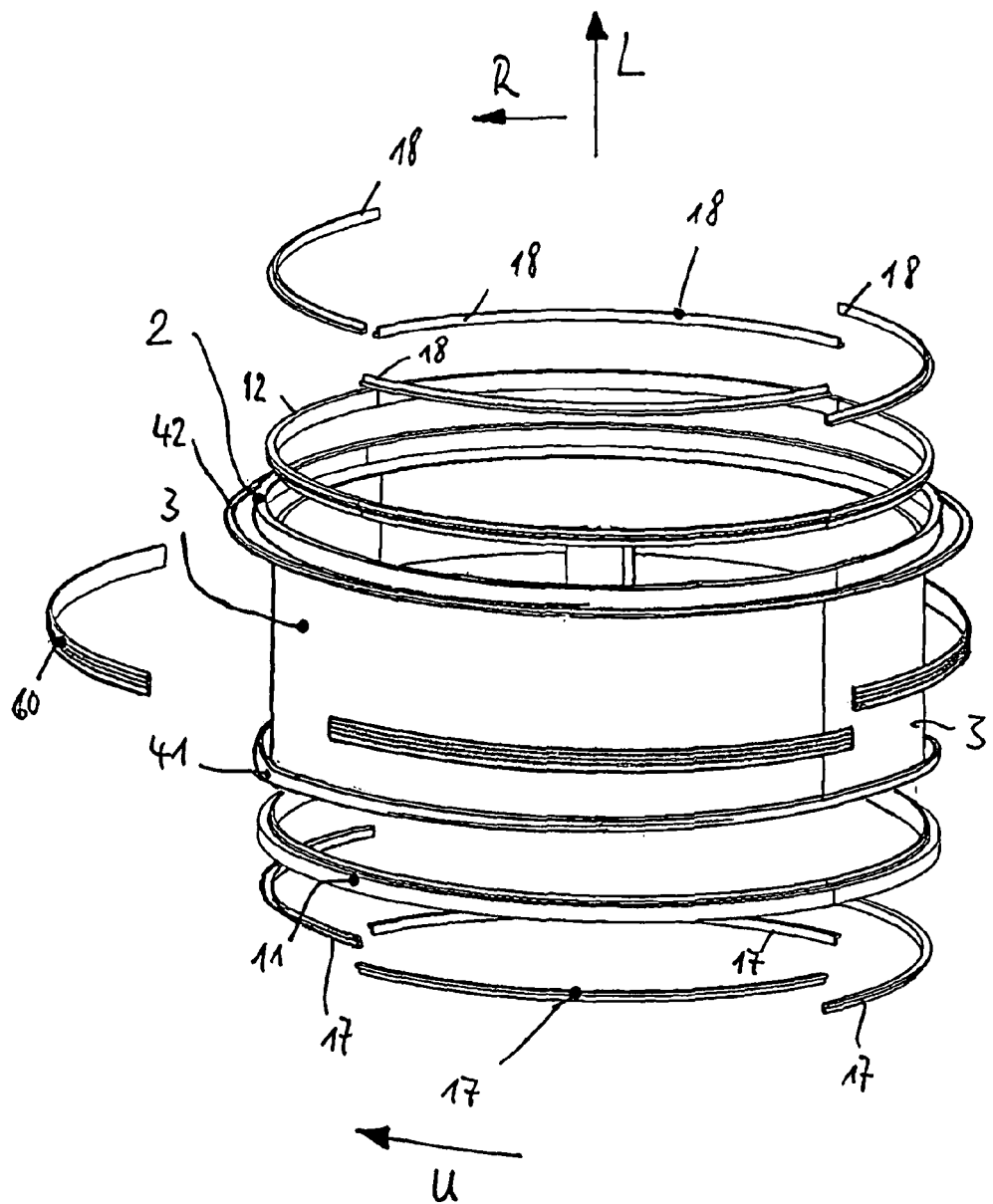
FIG. 1 illustrates a perspective exploded view of the drum and several ring-shaped or partly ring-shaped mould pieces provided according to the invention for arrangement on the rotatable drum.

FIG. 1 shows a perspective exploded view of the manufacturing device 1 provided according to the invention, with a drum 3 and with several ring-shaped or partly ring-shaped mould pieces placed on said drum 3, which mould pieces in one application example of the method according to the invention can be used to form a ring-shaped frame element for an aircraft fuselage for arrangement on the rotatable drum. At least one of the placed mould pieces comprises one or several outer surfaces, on which semifinished-product material can be placed.

Figure 2:
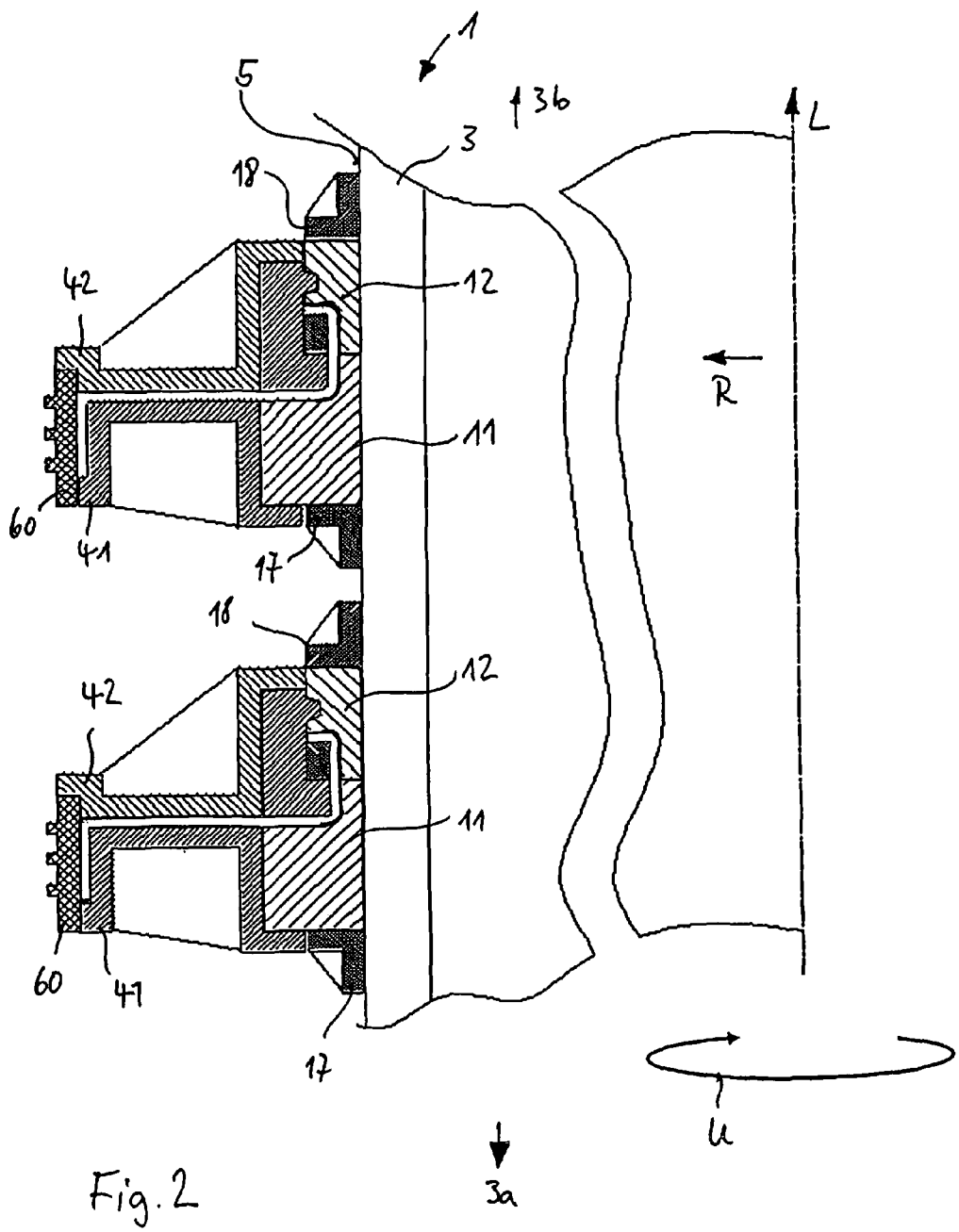
FIG. 2 illustrates a partial section of the rotatable drum in longitudinal direction of the latter with an exemplary completed structure of ring-shaped or partly ring-shaped mould pieces on the drum.

By means of the method according to the invention, or by means of the device according to the invention, it is not only possible to manufacture a profile, e.g. a frame element, but it is also possible to manufacture several profiles at the same time. As an example, FIG. 2 shows the simultaneous manufacture of two profiles. This increases the machine throughput and the number of components per time interval that can be manufactured with the manufacturing device according to the invention.

As a result of the division into several mould segments it is also possible to manufacture semifinished products or components that are not rotationally symmetrical. For example, components comprising basic cross sections that are elliptical can be manufactured. It is also possible to manufacture components comprising basic cross sections that are not closed, and that are, for example, partly elliptical or partly parabolic in shape.

The following can, in particular, be used as a semifinished product or as semifinished products: rovings, fabrics, interlaid textile scrim, prepregs and/or yarns. With the semifinished product a matrix material is used. The matrix material, for which a resin or a metal melt is used, is placed in the channel matrix material after the semifinished product has been placed in the respective channel section. The matrix material can in addition also be applied to the drum together with the semifinished product, e.g. in the case of prepregs.

For the purpose of the description, the drum 3 has been allocated the longitudinal direction L (FIG. 2), which coincides with its axis of symmetry. This results in a radial direction R and a circumferential direction U. FIGS. 3a to 3f show the sequence of the application of ring-shaped or partly ring-shaped mould pieces onto the drum for a modified application example in various method-related steps according to the invention. In this arrangement FIG. 2 shows a partial section of the rotatable drum in its longitudinal direction with the completed structure of ring-shaped or partly ring-shaped mould pieces on the drum, which structure is shown in steps in FIGS. 3a to 3f.

According to the method according to the invention for manufacturing ring-shaped or partly ring-shaped semifinished products or components from fibre-composite semifinished products comprising fibre-reinforced plastic, firstly positioning a multitude of ring-shaped or partly ring-shaped mould pieces on a rotatable drum takes place in such a manner that they extend in circumferential direction of the drum, thus forming a reel-shaped mould with a ring-shaped receptacle or a channel section for taking up the semifinished product, and subsequently multilayer application of the semifinished product in the ring-shaped receptacle of the reel-shaped mould. The ring-shaped receptacle is generated in a shape by means of which the formation of at least part of the component to be manufactured can take place.

In the exemplary embodiment shown in FIGS. 3a to 3f, at first on a support region or support area 5 of the rotatable drum 3 two ring-shaped mould pieces 11, 12 are arranged, which in the presently described exemplary embodiment cannot be exchanged in the course of the process and can therefore also be designated base-mould pieces. The support area 5 of the rotatable drum 3 can also be the circumferential surface of a sleeve located on the circumferential surface of the drum. Each mould piece 11, 12 comprises a first lateral surface 11a or 12a that faces a first drum end 3a, and a second lateral surface 11b, 12b that faces a second drum end 3b. The radial inner surfaces 11c, 12c of the base-mould pieces 11, 12, rest on the support area 5 of the drum 3.

In the exemplary embodiment described, the outer circumference surfaces 11d, 12d comprise a contour onto which partly a semifinished-product material can be placed or wound, which contour is suitable for receiving further mould pieces. To this effect, in the application example presently described, the mould pieces in each case comprise a recess 13 or 14, located at corresponding corners that are situated radially outside, so that the aforesaid with corresponding positioning of the mould pieces 11, 12 on the drum 3 form a contiguous recess 15. When viewed in the direction of the drum ends 3a, 3b, this recess 15 is delimited by an at first exposed, radially extending lateral surface 11b of the first mould piece 11, which lateral surface 13b faces the second drum end, and by an opposite, at first exposed, radially extending lateral surface 14a of the second mould piece 12, which lateral surface 14a faces the first drum end 3a. On each of their lateral surfaces 11a, 12b that face the respective drum ends 3a, 3b, the mould pieces 11, 12 are supported by a fixing angle 18, 17 when viewed towards the outside, i.e. in longitudinal direction L.

In the application example shown, semifinished-product material of a predetermined thickness that extends in radial direction R is inserted into the receptacle 15. After the step of curing the finished component, this semifinished-product layer 19 will form an inner bead of the frame element to be manufactured, wherein the layer thickness corresponds to the thickness of the inner bead (FIG. 3a).

In a further step a first and a second mould piece 21 or 22 are placed on the layer 19 provided for forming the inner bead, which mould pieces 21 or 22 in a subsequent step are replaced by other mould pieces so that these mould pieces can also be designated intermediate mould pieces. In the exemplary embodiment shown, the first intermediate mould piece 21 is designed and placed in the recess 15 in such a manner that the first intermediate mould piece 21 covers the second intermediate mould piece 22 radially on the outside, and the second mould piece 22 is received in a recess on the radial inside of the first intermediate mould piece 21. In this arrangement the second intermediate mould piece 22 and the second base-mould piece 12 are designed and placed together relative to each other in such a manner that between the first intermediate mould piece 22 and the adjacent radially extending sidewall 14a of the second base-mould piece 12 a radially extending channel or clearance 23 remains, which in addition extends in circumferential direction U of the drum 3. In a further step, likewise, semifinished-product material 23a is inserted into or placed on this radially extending clearance 23 so that a radially extending semifinished-product web results, which in the component to be manufactured forms a collar to the end, situated in axial direction of the component, of the inner bead of the frame element to be manufactured. The first radially extending lateral surface 21a of the first intermediate mould piece 21, which lateral surface 21a faces the first drum end 3a, rests against the lateral surface or recess wall 13b, which faces said lateral surface 21a, of the first base mould piece 11 (FIG. 3b).

Figure 3C:
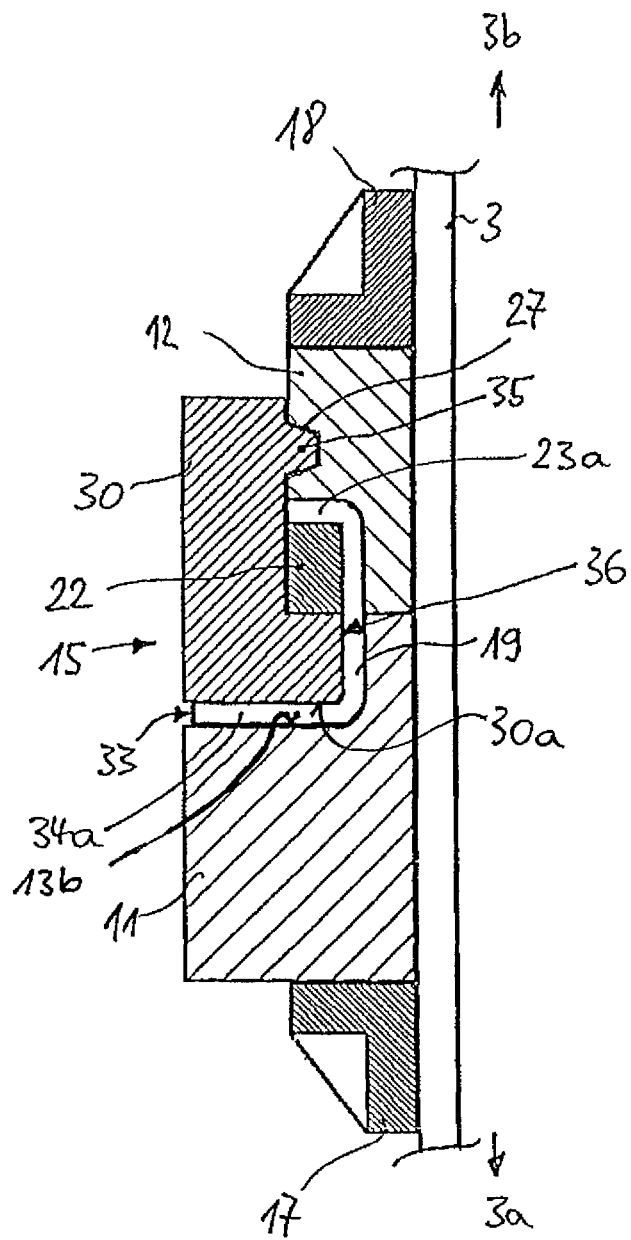
FIG. 3c illustrates a support region of the rotatable drum, on which support region, starting from the state shown in FIG. 3b, a further ring-shaped mould piece has been placed, in exchange for a previously placed mould piece, to additionally form a web of the frame element to be manufactured.

In a further step the first intermediate mould piece 21 is replaced by a third intermediate mould piece 30, which is also only used for an intermediate step and is thereafter replaced (FIG. 3c). The third mould piece 30 extends in axial direction L of the drum 3 at the latter's lateral section 36 along the first mould piece 11 and extends in axial direction beyond the latter also along a section of the second base-mould piece 12, wherein it rests against this section. For attachment or stabilisation of the third mould piece 30, on the side which faces the second base-mould piece 12, said third mould piece 30 comprises a projection 35 that extends in circumferential direction U and is directed towards the drum axis (i.e., in the radial direction R). Furthermore, the second base-mould piece 12, on the side facing the third mould piece 30 comprises a groove 27 for receiving in a positive-locking manner the circumferential projection 35 and for fixing the third intermediate piece in axial direction L of the drum 3. The third mould piece 30 is designed and located in the recess 15 in such a manner that at least portions thereof overly the first mould piece 11 and/or the second base-mould piece 12 in the radial direction R of the drum, and that between its first, radially extending, sidewall 30a, which faces the first drum end 3a, and the lateral surface 11b or recess wall of the first base-mould piece 11, said sidewall provides a channel or clearance 33 that extends radially and in circumferential direction U, into which channel or clearance 33 in a further step semifinished-product material 34 is inserted that follows on at a right angle from the material layer 19 for forming the inner bead (FIG. 3c).

In a further step a first profiled mould piece 41 and a second profiled mould piece 42 are placed onto the mould-piece structure (FIG. 3d) which first profiled mould piece 41 and second profiled mould piece 42 are designed and positioned on the mould-piece structure established so far that between the aforesaid a clearance 43 that extends in radial direction R forms, which clearance 43 follows on from the radially extending clearance 33 with the same width (FIG. 3e). In this arrangement the clearance 43 forms between facing radially extending lateral surfaces 41b, 42a, which are opposite each other, of the first profiled mould piece 41 or of the second profiled mould piece 42. Subsequently, again, matrix material and/or semifinished-product material is inserted into the clearance 33, so that in the component to be manufactured, a radially-extending semifinished-product web results, which in the aforesaid represents an extension of the web arising as a result of the clearance 33.

Figure 3D:
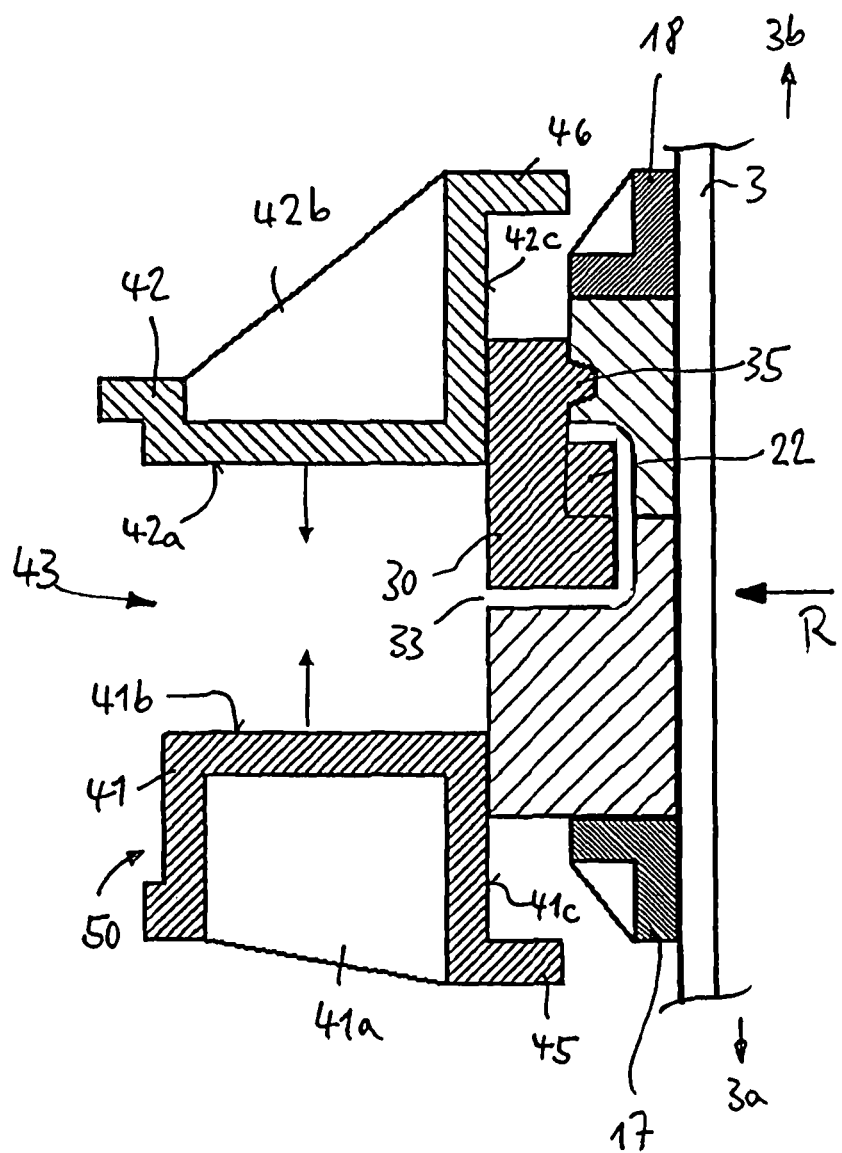
FIG. 3d illustrates a support region of the rotatable drum, on which support region, starting from the state shown in FIG. 3c, two further ring-shaped mould pieces have been placed in exchange for an already placed mould piece, and two further ring-shaped mould pieces have been placed to improve the web formed in the preceding step on the frame element to be manufactured.

At its inner circumference the first profiled mould piece 41 comprises a support area 41c that is designed in such a manner and in particular comprises an inside radius that the first profiled mould piece 41 can be slid from the first end 3a of the drum 3 in longitudinal direction L onto the existing mould structure. Likewise, the second profiled mould piece 42 at its inner circumference comprises a support area 42c that is designed in such a manner and in particular comprises such an inside radius that the second profiled mould piece 42 from the direction of the second end 3b of the drum 3 can be slid in longitudinal direction L onto the existing mould structure (FIG. 3d). To reinforce the mould pieces 41 and 42 against torsion and against forces acting in circumferential direction U, said mould pieces 41 and 42 at their outer sides that face the first 3a or the second 3b drum end comprise ribs 41a or 42b. Furthermore, the mould pieces 41 and 42 at their inner surface 41c or 42c comprise ring-shaped or other types of projections 45, 46 that project from said inner surface 41c or 42c towards the inside, i.e. towards the centre axis of the drum. When the mould pieces 41, 42 are slid onto the arrangement of the mould pieces that are already positioned on the drum 3, said projections come to rest against a lateral surface of the respective mould piece 11 or 30, which lateral surface is directed towards the respective drum end 3a, 3b, onto which mould piece 11 or 30 the respective mould piece 41 or 42 in the given application example is pushed from the direction of the respective drum end 3a or 3b.

In the exemplary embodiment shown the mould piece 41 in close proximity to the first drum comprises a receptacle or indentation or channel 50 whose width extends in the axial direction of the drum and whose interior is connected to the clearance 43. Further semifinished-product material is inserted into the channel 50, which semifinished-product material follows on from the material inserted into the clearance 43. In the component to be manufactured the material inserted into the channel 50 forms a ring-shaped outer flange that extends in axial direction of the drum 3.

To close off the mould structure in the application example according to FIGS. 3a to 3f, from the direction of the first drum end 3a a ring-shaped cover element 60 or end piece is slid onto said mould structure against a stop face 47 which when viewed from the direction of the first drum end 3a is situated beyond the outermost channel 50, so that with a corresponding design of the ring cover element 60 the latter covers the channel 50 (FIG. 3f). Under the cover element 60 the channel 50 ends and the cover element 60 closes off the channel 50 so that when the drum 3 is rotated the cover element 60 prevents the matrix material from moving from the channel.

In the mould piece structure it is thus possible to use mould pieces that are in one piece, and, in particular, that have been manufactured in one piece. In the present application example this applies to the mould pieces 11, 12, 41, 42. Furthermore, it is possible to use mould pieces that comprise several, i.e. at least two, circumferential parts, which when placed together form a ring that is closed in circumferential direction U. In the present application example this applies to the mould pieces 21, 22, 30. Some of these are mould pieces that for kinematic reasons cannot be moved to their intended positions by sliding them on. In these mould pieces that are put together in circumferential direction, the aforesaid are attached to each other in circumferential direction, and for this purpose it is possible, for example, to use coupling elements or circumferential straps that are attached to their ends located in circumferential direction.

According to the invention, preferably components are manufactured in a shape that when said components are arranged relative to each other a course of the channel to be formed results that comprises sections that extend at least in radial direction. In this arrangement a combination of single-piece mould pieces, or mould pieces that have been manufactured in a single piece are used, which mould pieces for kinematic reasons necessarily extend in circumferential direction.

The characteristics of the mould pieces of the described application example can be combined in a different manner for other application examples, i.e. differently designed components to be manufactured, depending on the construction of the mould structure and the resulting kinematic circumstances.

In this arrangement it is, in particular, also possible to provide mould pieces such as the mould pieces 21 or 22 that are only used for an intermediate step of the placement of semifinished product, and which thereafter are replaced by other mould pieces in order to continue the channel into which semifinished-product material is to be placed.

The semifinished-product material can, for example, be placed in layers as an interlaid scrim or fibre mats, or it can be wound in as yarn or roving in the respectively prepared channel, and can be placed in this manner into said channel. In this arrangement it can, in particular, be provided for the fibres or threads or yarns or rovings of the semifinished products to be inserted into the channel section in a predetermined orientation.

The respectively prepared channel is preferably designed in such a manner with the mould pieces used in the respective mould design that said channel can then be filled with the semifinished-product material in a uniform manner, in other words e.g. with the use of the same winding technique or application technique. However, it is also possible to use a combination of different application methods when filling the respectively prepared channel.

The channel to be created, which extends in circumferential direction and in radial direction, when viewed in axial section of the drum extends in some sections in radial direction or in axial direction, if applicable with corresponding transitions between an axial and a radial region. In particular cases it is also possible to form a channel whose cross section when viewed in axial section of the drum extends transversely to the axial direction L or to the radial direction R.

Together with, or after, positioning a multitude of ring-shaped or partly ring-shaped mould pieces on the rotatable drum 3 such that they form a reel-shaped mould with a ring-shaped channel, formed from channel sections 19, 33, 45, 50, for receiving the semifinished product, as well as after multilayer application of the semifinished product in the channel of the reel-shaped mould, optionally the placement of matrix material in the channel filled with the semifinished-product material takes place. This step can also be done without if the semifinished product already comprises an adequate quantity of matrix material.

This can take place step-by-step after preparation of a channel section 19, 33, 45, 50, or after preparation of a multitude of channel sections 19, 33, 45, 50 or after preparation of the entire channel formed by the channel sections 19, 33, 45, 50, and in particular after placement of a ring cover element 60.

In this arrangement the semifinished product can already comprise matrix material, e.g. if prepreg is used as the matrix material.

As an alternative or in addition, either during the mould-piece construction or thereafter, a matrix-material feed channel can be formed that communicates with a matrix-material supply device with a reservoir for the matrix material so that matrix material can be inserted by the matrix-material supply device into the channel 19, 33, 45, 50 formed by mould pieces. The matrix-material supply device can be situated within the drum 3*a* or outside the drum 3 so that the feed channel can extend from the channel 19, 33, 45, 50, formed by mould pieces, to the region within the drum or into the outer surroundings of the drum.

After placement of semifinished-product material and of matrix material in the channel 19, 33, 45, 50 formed by mould pieces, the drum is rotated in such a manner that due to the centrifugal forces the matrix material is pressed towards the outside, and air contained in the channel is radially displaced towards the inside so that the channel filling is prepared for the creation of a high-quality plastic product.

For the purpose of displacement or escape of air from the channel 19, 33, 45, 50, an additional outlet channel can be formed that has been created as a result of a clearance between mould pieces, or that can take place by other means, e.g. the insertion of a drain tube or cannula in the mould piece situated furthest inwards. The outlet channel extends from the position situated furthest inwards of the channel 19, 33, 45, 50 formed by mould pieces. The outlet channel extends into the interior of the drum 3 and at its inner end can be open or can lead into a receptacle. The outlet channel can also be identical to the feed channel if the latter, at the radially furthest inwards position of the channel 19, 33, 45, 50 formed from mould pieces, leads into said channel 19, 33, 45, 50.

In a further step, curing the semifinished-product material and matrix material, which is located in the channel 19, 33, 45, 50 formed by mould pieces, takes place with the application of temperature to form a plastic ring or partial ring, and the removal of the plastic ring from the reel-shaped mould or of the mould-piece structure comprising mould pieces.

The mould pieces used according to the invention need not be rotationally symmetrical or partly rotationally symmetrical, in other words they need not comprise edges that are parallel in circumferential direction; instead they can, for example, be ramp-shaped when viewed in circumferential direction U, which according to the invention is also covered by the designation "ring-shaped or partly ring-shaped". Depending on the design of the component to be manufactured, the mould pieces can also be non-symmetrical in shape. The essential part consists of these components being joined to each other in a step-by-step manner so that between them a channel is formed for the insertion of semifinished product and/or for the introduction of matrix material. The channel has a component in circumferential direction and in radial direction so that during rotation of the drum a centrifugal effect is exerted on the matrix material.

The characteristics of the mould pieces, e.g. of the base-mould pieces and the intermediate mould pieces as well as of other mould pieces, can generally be provided or not provided on said mould pieces so that an arrangement of said mould pieces can be achieved in which the manufacture of a component of a predetermined shape can take place according to the invention.

The invention claimed is:

1. A method for manufacturing a fibre-reinforced-plastic-containing ring-shaped or partly ring-shaped semifinished product or component from fibre-composite semifinished products, including the steps of:
    (a) positioning at least one ring-shaped or partly ring-shaped mould piece on a rotatable drum in such a manner that the latter comprises a reel-shaped mould with a ring-shaped or partly ring-shaped channel section that extends in an outward radial direction, and in a longitudinal direction, of the drum,
    (b) multilayer application of semifinished product material in the channel section of the reel-shaped mould,
    (c) at least one repetition of steps (a) and (b) with the addition of at least one ring-shaped or partly ring-shaped mould piece on the rotatable drum while forming a further channel section that continues on from the existing channel section, and placement of semifinished-product material in the channel section, wherein a created sequence of channel sections at least in part provides the mould for the component to be manufactured,
    (d) placing matrix material in the channel sections with the insertion of semifinished-product material in individual channel sections and after forming at least one channel section,
    (e) after forming the channel sections with semifinished product material and matrix material contained therein, rotating the drum in such a manner that as a result of the centrifugal forces the matrix material is pressed towards the outside and air contained in the channel is displaced radially inwards,
    (f) curing the matrix material contained in the channel,
    (g) after curing the ring-shaped semifinished product or component, separating the mould pieces into sections, and removing the cured ring-shaped semifinished product or component,
    wherein at least two mould pieces are designed in such a manner that they interact in a positive-locking manner, via a projection and groove arrangement, so that one of the at least two mould pieces is situated on, and affixed to, an outside of another of the at least two mould pieces in the radial direction of the drum so that a sidewall, directed in the axial direction, of the one mould piece forms a sidewall of a channel section.

2. The method according to claim 1, wherein the channel section is a recess that is radially open towards the outside.

3. The method according to claim 1, wherein two mould pieces are placed on the respectively formed arrangement of mould pieces in such a manner that two opposing sidewalls of the mould pieces, which sidewalls extend along the radial direction of the drum, form a channel section so as to form a component web that follows on from a channel section that has already been formed by means of mould pieces, and that on corresponding receiving surfaces of the mould pieces a cover element that extends in circumferential direction is applied, which cover element closes off the formed channel section in radial direction towards the outside so that during rotation of the drum the end piece prevents the matrix material from moving out of the channel.

4. The method according to claim 1, wherein:
    a surface of the cover element and the top of at least one of the mould pieces form a channel section that extends in axial direction of the drum, which channel section follows on from a channel section that extends along the radial direction of the drum so as to form a component web, and
    in order to form an axially extending flange, semifinished-product material is inserted and matrix material is introduced into the axially extending channel section.

5. The method according to claim 1, wherein, in the formation of the reel-shaped mould with the ring-shaped channel comprising a multitude of ring-shaped or partly ring-shaped mould pieces, at least one feed channel is formed for introducing matrix material into the channel, through which feed channel matrix material is introduced into the channel sections.

6. The method according to claim 1, wherein a feed channel leads from the interior of the drum into the channel.

7. The method according to claim 1, wherein a feed channel is formed that leads from the channel to the external surroundings of the drum.

8. The method according to claim 1, wherein the insertion of semifinished product material in a channel section takes place by means of a winding method or a laying method.

9. The method according to claim 1, wherein at least one of:
    the matrix material is inserted into the channel sections by means of inserting prepreg semifinished-product material, and
    a resin, a thermoplast or a metal melt is used as a matrix material.

10. The method according to claim 1, wherein fibre material with a predetermined fibre orientation is used as a semifinished product;
    the semifinished products are inserted into the channel sections in a predetermined manner in order to provide the ring-shaped semifinished product or component that is to be manufactured, which semifinished product or component comprises fibre-reinforced plastic, with a predetermined fibre orientation; and
    rovings, fabrics, interlaid textile scrim, prepreg and/or yarns are used as a semifinished product.

11. The method according to claim 1, wherein the mould pieces comprise fibre-reinforced materials.

12. The method according to claim 1, wherein the channel of the ring-shaped mould is formed in such a manner that said channel forms the mould for a combination comprising at least one bead and at least one web for the component to be manufactured.

13. The method according to claim 1, wherein positioning a multitude of ring-shaped or partly ring-shaped mould pieces on a rotatable drum takes place in such a manner that on the same drum in longitudinal direction (L) of the drum side by side several components comprising fibre-composite semifinished products are manufactured and removed from the drum.

* * * * *